United States Patent
Jung et al.

(10) Patent No.: US 10,444,063 B2
(45) Date of Patent: Oct. 15, 2019

(54) DOWNHOLE FIBER OPTIC HYDROPHONE

(71) Applicant: BAKER HUGHES INCORPORATED, Houston, TX (US)

(72) Inventors: Sebastian Jung, Isernhagen (DE); Gunnar Tackmann, Hannover (DE); Andreas Herbel, Hannover (DE); Thomas Kruspe, Wietzendorf (DE)

(73) Assignee: Baker Hughes, a GE company, LLC, Houston, TX (US)

( * ) Notice: Subject to any disclaimer, the term of this patent is extended or adjusted under 35 U.S.C. 154(b) by 45 days.

(21) Appl. No.: 15/274,654

(22) Filed: Sep. 23, 2016

(65) Prior Publication Data
US 2018/0087956 A1 Mar. 29, 2018

(51) Int. Cl.
*G01H 9/00* (2006.01)
*G01V 8/00* (2006.01)
(Continued)

(52) U.S. Cl.
CPC ............. *G01H 9/004* (2013.01); *G01V 1/186* (2013.01); *G01V 1/226* (2013.01); *G01V 8/00* (2013.01); *G01H 9/00* (2013.01); *G01V 1/42* (2013.01); *G01V 2200/16* (2013.01); *G01V 2210/1429* (2013.01)

(58) Field of Classification Search
CPC .......... G01V 8/00; G01V 1/226; G01V 1/186; G01H 9/00; G01H 9/004
See application file for complete search history.

(56) References Cited

U.S. PATENT DOCUMENTS

| | | | |
|---|---|---|---|
| 6,233,746 B1* | 5/2001 | Skinner | E21B 47/06 250/227.18 |
| 6,246,048 B1* | 6/2001 | Ramos | G01L 1/246 250/227.18 |

(Continued)

FOREIGN PATENT DOCUMENTS

WO 2015187166 A1 12/2015

OTHER PUBLICATIONS

PCT/US2017/053274—International Search Report dated Jan. 5, 2018.

(Continued)

*Primary Examiner* — Ian J Lobo
(74) *Attorney, Agent, or Firm* — Mossman, Kumar & Tyler, P.C.

(57) ABSTRACT

Methods, systems, devices, and products for acoustic detection in a borehole. Apparatus embodiments comprise an acoustic sensor including: a pressure transducer comprising a flexing member attached to an optical medium, the transducer configured to convert a low-amplitude, high-frequency acoustic pressure signal within a nominal borehole pressure incident on the transducer to an alternating strain on the optical medium along an axis of the medium via movement of the flexing member while suppressing conversion of low-frequency signals and constant pressure into strain of the optical medium, the acoustic pressure signal propagated via a downhole fluid coupled with the transducer; and a detector configured to generate acoustic measurement information responsive to received electromagnetic radiation transmitted through the medium along the axis, the at least one optical property of the medium being responsive to the alternating strain on the medium such that the electromagnetic radiation received by the detector represents the acoustic signal.

19 Claims, 10 Drawing Sheets

(51) Int. Cl.
    *G01V 1/18*    (2006.01)
    *G01V 1/22*    (2006.01)
    *G01V 1/42*    (2006.01)

(56) References Cited

U.S. PATENT DOCUMENTS

| | | | |
|---|---|---|---|
| 6,396,572 | B1 | 5/2002 | Chang et al. |
| 7,751,279 | B2 | 7/2010 | Zhao et al. |
| 8,055,448 | B2 | 11/2011 | Mathiszik et al. |
| 8,750,074 | B2 | 6/2014 | Blias |
| 8,811,114 | B2 | 8/2014 | Geerits et al. |
| 2006/0289724 | A1* | 12/2006 | Skinner ................ G01D 5/268 250/221 |
| 2007/0292071 | A1* | 12/2007 | Zerwekh ................ E21B 47/06 385/12 |
| 2011/0229071 | A1 | 9/2011 | Vincelette et al. |
| 2014/0338438 | A1 | 11/2014 | Fripp et al. |
| 2015/0300848 | A1 | 10/2015 | Campbell et al. |
| 2015/0377765 | A1* | 12/2015 | Chilukuri ............... G01N 17/04 356/73.1 |
| 2016/0266265 | A1 | 9/2016 | Kruspe et al. |

OTHER PUBLICATIONS

Foster, Scott et al., "Towards a High Performance Fiber Laser Hydrophone," Jnl of Lightwave Technology vol. 29, No. 9, pp. 1335-1342 (May 2011).

Foster, Scott et al., "A Fibre Laser Sensor Seabed Array," 3 pp., Proceedings of Acoustics, Victor Harbor, AU (2013).

* cited by examiner

DOWNHOLE FIBER OPTIC HYDROPHONE

FIELD OF THE DISCLOSURE

This disclosure generally relates to borehole tools, and in particular to methods and apparatuses for conducting acoustic investigation in a borehole intersecting an earth formation. More particularly, the disclosure relates to acoustic sensors and methods of using such acoustic sensors in various tools, including acoustic logging tools.

BACKGROUND OF THE DISCLOSURE

Drilling wells for various purposes is well-known. Such wells may be drilled for geothermal purposes, to produce hydrocarbons (e.g., oil and gas), to produce water, and so on. Well depth may range from a few thousand feet to 25,000 feet or more. In hydrocarbon wells, downhole tools often incorporate various sensors, instruments, and control devices in order to carry out any number of downhole operations. Downhole acoustic logging tools, which are used to investigate subsurface features, can include one or more acoustic transmitters or sources and a number of acoustic receivers. Additionally or alternatively, self-contained acoustic sensors may be installed within the borehole on either a temporary or permanent basis.

In some cases, the transmitters emit acoustic energy into the subsurface environment surrounding the wellbore. The acoustic signals are reflected by interfaces associated with the wellbore, well structures, and/or the formation. The reflected acoustic signals are detected by the receivers in the logging tool and processed to provide estimates of one or more properties of the wellbore, well structures, and/or the formation. Drilling systems having an acoustic "logging-while-drilling" ('LWD') or "measurement-while-drilling" ('MWD') system as part of a bottomhole assembly, or an after-drilling wireline logging system having an acoustic device for measuring properties of subsurface formations (during or after drilling of the wellbores), such as, for example, determining the location of formation bed boundaries around the bottomhole assembly, as in the MWD system, or around the wireline logging system are known.

In drilling a borehole to recover oil from the earth, it is often helpful to turn or steer the downhole drill bit toward or away from subterranean targets. Acoustic data may be used to determine a drill bit location on the seismic section to facilitate geosteering. With Vertical Seismic Profiling (VSP), acquisition may be conducted between one or more acoustic (seismic) sources on or near the surface of the earth, and receivers in the earth, such as, for example, in a wellbore. The response of an acoustic sensor, such as a seismic sensor (e.g., a hydrophone) at various depths in a borehole to sources on the surface may be recorded as downhole measurements.

SUMMARY OF THE DISCLOSURE

In aspects, the present disclosure is related to methods and apparatus for performing formation evaluation in a borehole intersecting an earth formation, including estimating at least one parameter of interest relating to the formation, such as, for example, a property of an acoustically reflective boundary in the formation.

Apparatus embodiments may comprise an acoustic sensor including: a pressure transducer comprising a flexing member attached to an optical medium, the transducer configured to convert a low-amplitude, high-frequency acoustic pressure signal within a nominal borehole pressure incident on the transducer to an alternating strain on the optical medium along an axis of the medium via movement of the flexing member while suppressing conversion of low-frequency signals and constant pressure into strain of the optical medium, the acoustic pressure signal propagated via a downhole fluid coupled with the transducer; and a detector configured to generate acoustic measurement information responsive to received electromagnetic radiation transmitted through the medium along the axis, the at least one optical property of the medium being responsive to the alternating strain on the medium such that the electromagnetic radiation received by the detector represents the acoustic signal. The pressure transducer may comprise an interface between reservoirs containing a reservoir fluid, with the interface comprising the flexing member and at least one opening providing for communication of the reservoir fluid between the reservoirs.

The apparatus may comprise a portion of a drillstring, and the ambient pressure noise may comprise vibration of the drillstring. The received radiation comprises at least one of: i) radiation transmitted through a fiber Bragg grating (FBG) in the medium; ii) radiation reflected from a fiber Bragg grating (FBG) in the medium. A ratio of an average signal amplitude of the high-frequency acoustic pressure signal to the nominal borehole pressure may be less than $10^{-3}$.

The pressure transducer may be configured to fluid-mechanically filter low-frequency ambient pressure noise. The opening and the reservoirs may be configured to fluid-mechanically filter ambient pressure noise using bypass flow of the reservoir fluid through the opening via pressure equalization. The flexing member may comprise at least one of: i) a membrane; and ii) a bender bar. The at least one opening may comprise at least one of: i) a slit in the flexing member; and ii) a capillary tube. The at least one opening may comprise a plurality of slits, and the flexing member may comprise a portion of the interface between a first slit of the plurality and a second slit of the plurality.

The pressure transducer may include a second interface between one of the reservoirs and the downhole fluid, the second interface comprising a second flexing member responsive to the high-frequency acoustic pressure signal incident on the transducer. A first reservoir of the reservoirs may be defined by a first reservoir member and a second reservoir of the reservoirs may be defined by a second reservoir member. The first reservoir member may be received by the second reservoir member.

The dimensions and orientations of the reservoirs may be configured to suppress acceleration-induced quasi-hydrostatic pressure signals by producing a pressure at the flexing member in the first reservoir substantially equal to another pressure at the flexing member in the second reservoir. In some apparatus embodiments, every plane normal to a line intersecting the center of gravity of the combined reservoir fluid volumes intersects either: i) both the first reservoir and the second reservoir, or ii) neither the first reservoir nor the second reservoir.

The transducer may comprise a flexural element supporting the flexing member. The transducer may comprise a flexural element supporting the flexing member and configured to amplify movement of the flexing member. The medium may comprise fiber Bragg gratings positioned with respect to the flexural element proximate a location of maximum displacement of the medium. The transducer may include a reservoir filled with a dilatant fluid. The dilatant fluid may be configured to act, responsive to the high-frequency acoustic pressure signal, as a solid transmitting the high-frequency acoustic pressure signal to the flexing member, and, responsive to the ambient pressure noise, as a liquid preventing transmission of the ambient pressure noise to the flexing member.

Methods include using a pressure transducer comprising a flexing member attached to an optical medium to convert a low amplitude, high-frequency acoustic pressure signal within a nominal borehole pressure incident on the pressure transducer to an alternating strain on the optical medium along an axis of the medium via movement of the flexing member while suppressing conversion of low-frequency signals and constant pressure into strain of the optical medium, the acoustic pressure signal propagated via a downhole fluid coupled with the transducer; and using a detector to generate acoustic measurement information responsive to received electromagnetic radiation transmitted through the medium along the axis, the at least one optical property of the medium being responsive to the alternating strain on the medium such that the electromagnetic radiation received by the detector represents the acoustic signal. Methods may include using the acoustic measurement information to estimate a parameter of interest, such as a property of the formation or the borehole. The parameter of interest may be at least one of: i) a slowness of a volume of interest of the formation; ii) an acoustic data communication message; iii) a stand-off from the transducer to a wall of the borehole; iv) a geometry of the borehole; and v) a sound speed of the downhole fluid.

Some embodiments include a non-transitory computer-readable medium product accessible to the processor and having instructions thereon that, when executed, causes the at least one processor to perform methods described above. Apparatus embodiments may include at least one processor and a computer memory accessible to the at least one processor comprising a computer-readable medium having instructions thereon that, when executed, causes the at least one processor to perform methods described above.

Examples of some features of the disclosure may be summarized rather broadly herein in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

Figure 1A:
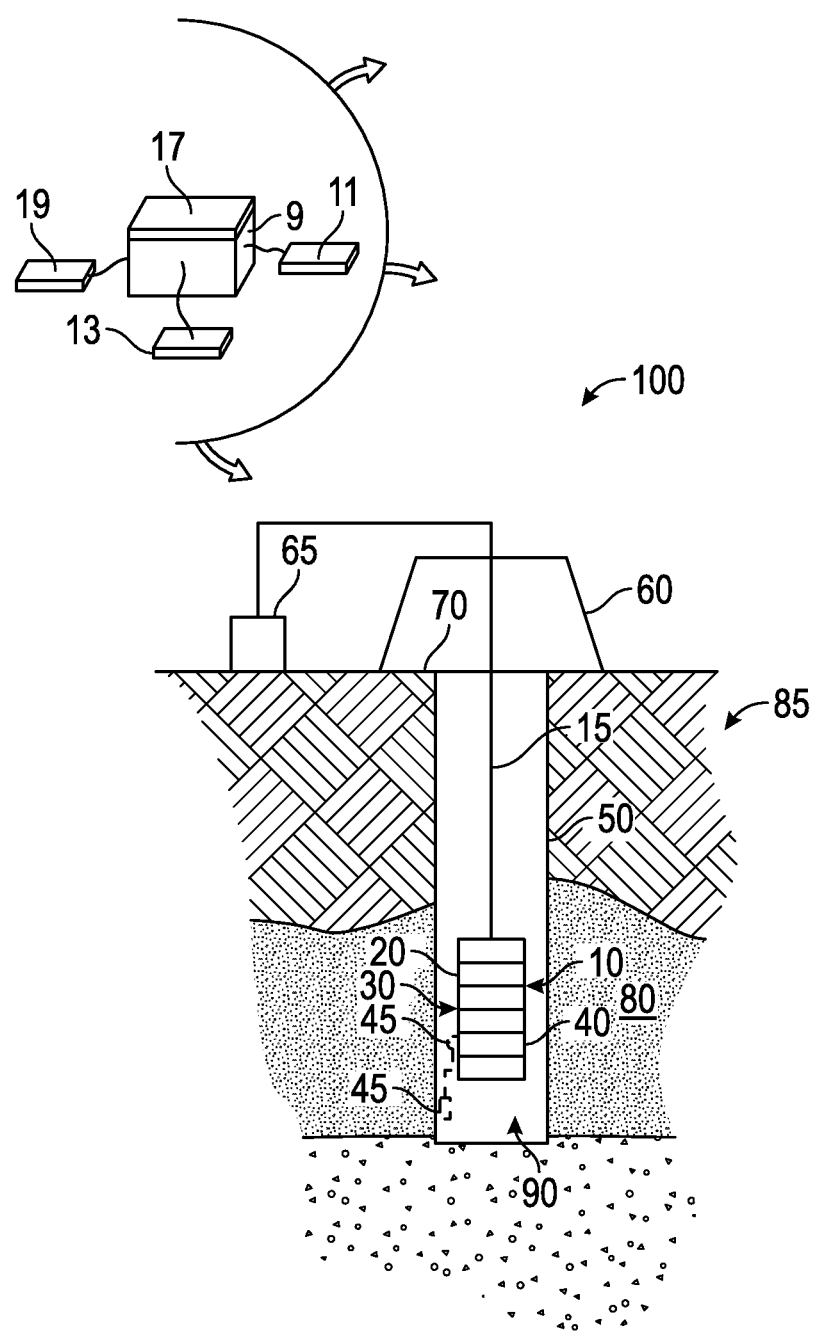
FIGS. 1A & 1B illustrate components of systems in accordance with embodiments of the present disclosure.

Aspects of the present disclosure relate to apparatus and methods for acoustic well logging, including measurement and interpretation of physical phenomena indicative of parameters of interest of the formation, the borehole, or the downhole fluids therein, including vertical seismic profiling (using seismic measurements from the borehole). Aspects of the present disclosure include a novel acoustic sensor (e.g., a hydrophone) well suited for detecting very small pressure differences (e.g., acoustic signals) in a very high-pressure environment. Aspects of the disclosure may be suited to detection of acoustically reflective boundaries (referred to herein as 'reflectors' or 'boundaries'), e.g., geologic structures, and related parameters of interest (e.g., properties of these boundaries) from borehole acoustic array data.

Aspects of the disclosure include acquisition of a vertical seismic profile (VSP) using a sensor inside the wellbore and a source at the surface near the well. VSP measurements may result in images of higher resolution than surface seismic images. VSP measurements may also be used for looking ahead of the drill bit during drilling operations. A surface seismic source (e.g., a plate vibrator on land, an air gun at sea) may be used to generate the detected acoustic signals.

Embodiments of the disclosure include methods of evaluating an earth formation. Methods may include deploying an array of seismic receivers in a borehole and recording seismic signals in the array of receivers responsive to an activation of a seismic source at a plurality of positions on the surface of the earth. For a walkaway geometry, the method may further include estimating, from travel times of seismic waves from the plurality of source positions to the plurality of receivers, velocities of propagating seismic waves over a plurality of intervals. Estimated parameters (e.g., vertical velocities, estimated anisotropy parameters, etc.) may be used to further process surface seismic data to give a seismic image in depth for the purpose of interpretation.

Aspects of the disclosure may relate to seismic inversion, wherein seismic reflection data is processed to recover parameters of interest including properties of a volume of interest of the formation, such as a portion of the saturated rock matrix. Such parameters may include acoustic impedance, shear impedance, density, anisotropy parameters, and so on. Performing the inversion may include the use of further constraints generated from additional reservoir measurements (e.g., well logs). Further aspects relate to the estimation of formation slowness, acoustic data communication messages (e.g., mud pulse, etc.), acoustic stand-off, acoustic caliper, general sound speed measurements, and so on.

It is known to detect acoustic signals in liquids with hydrophones employing optical fibers carrying fiber Bragg gratings (FBG). These sensors use the FBG in combination with a pressure transducer converting the acoustic signal (e.g., alternating pressures) to alternating strain acting on the optical fiber along the fiber axis. The FBG reflects a small spectral portion of the light propagating in the optical fiber. The central wavelength of this spectrum changes with the measured quantity (e.g., pressure), which is detected using an optical detector at one end of the fiber (detecting either the reflected or the remaining spectrum).

In aspects of the present disclosure, Bragg gratings may be written into the fiber or other optical medium (e.g., bulk glass or glass foil) using a femtosecond laser. This technique allows imprinting of various grating shapes by modifying the grating period and depth, and hence to realize a wide variety of effects, including apodized, pi-shifted, and chirped gratings, among others. Furthermore, this process can be applied to standard optical fibers. In contrast, UV light-based methods, which may be advantageous in particular applications, may require photo-sensitive fiber cores and may suffer from hydrogen darkening under downhole conditions. Using the femtosecond-laser based process thus may increase the life of the fiber and potentially reduce packaging costs.

To obtain hydrocarbons such as oil and gas, boreholes (wellbores) are drilled through hydrocarbon-bearing subsurface formations. Recently, horizontal boreholes, extending several thousand meters ("extended reach" boreholes), have been drilled to access hydrocarbon reserves at reservoir flanks and to develop satellite fields from existing offshore platforms. Downhole acoustic logging tools, which are used to investigate subsurface features, can include one or more acoustic transmitters or sources and a number of acoustic receivers. Alternatively, the drilled borehole may be outfitted with stand-alone acoustic sensors.

The environmental conditions in deep oil wells, such as, for example, underground or undersea wells, are very harsh. Temperatures may approach 250 degrees Celsius and pressures may reach 20-30,000 psi (200 MPa) or more. In addition to the rigorous tool specifications required to prevent premature wear or failure, these very high pressures also exacerbate the small amplitude of the desired signal and make accurate signal detection problematic. The variation in acoustic pressure signal may be, for example, 1 Pa to 10 kPa ($10^{-4}$ to 1 psi), on the very large constant offset pressure provided by the ambient pressure of the borehole. Thus, a ratio of an average signal amplitude of the high-frequency acoustic pressure signal to the nominal borehole pressure is often less than $10^{-3}$, and may reach the range of $10^{-4}$ to $10^{-6}$ or less. For example, it may be desirable for a signal pressure of less than 0.1 psi to be detected on an offset pressure of 20,000 psi or more.

Thus, aspects of the present disclosure include methods and apparatus for use in a borehole detecting acoustic signals. General apparatus embodiments may comprise an acoustic sensor including a pressure transducer comprising a flexing member attached to an optical medium. An acoustic pressure signal may be propagated via a downhole fluid coupled with the transducer. The transducer may be configured to convert a low-amplitude, high-frequency acoustic pressure signal within a nominal borehole pressure incident on the transducer to an alternating strain on the optical medium along an axis of the medium via movement of the flexing member. The configuration may be such that this is accomplished while suppressing conversion of both low-frequency signals and constant pressure signals into strain of the optical medium. The pressure transducer may be further configured to fluid-mechanically filter low-frequency ambient pressure noise.

A detector may be configured to generate acoustic measurement information responsive to received electromagnetic radiation transmitted through the medium along the axis, with the at least one optical property of the medium being responsive to the alternating strain on the medium such that the electromagnetic radiation received by the detector represents the acoustic signal. See, for example, U.S. Pat. No. 6,396,572 to Chang et al.

In particular embodiments, the pressure transducer comprises an interface between reservoirs containing a reservoir fluid. The interface may include the flexing member and at least one opening providing for communication of the reservoir fluid between the reservoirs. The opening and the reservoirs may be configured to fluid-mechanically filter ambient pressure noise using bypass flow of the reservoir fluid through the opening via pressure equalization. The pressure transducer may further include a second interface between one of the reservoirs and the downhole fluid, the second interface comprising a second flexing member responsive to the high-frequency acoustic pressure signal incident on the transducer. The transducer may include a flexural element supporting the flexing member.

In other embodiments, the transducer may be implemented with a reservoir filled with a dilatant fluid. The dilatant fluid may be configured to act, responsive to the high-frequency acoustic pressure signal, as a solid transmitting the high-frequency acoustic pressure signal to the flexing member; responsive to the ambient pressure noise, the dilatant fluid may be configured to act as a liquid preventing transmission of the ambient pressure noise to the flexing member.

Aspects of the present disclosure relate to using at least one acoustic sensor as part of one or more downhole acoustic well logging tools or distributed sensor systems to produce acoustic information responsive to a pressure signal received at the sensor from the earth formation. The signal may be seismic in nature, or may be generated from excitations in the borehole. At least one acoustic receiver may be disposed in the borehole. The information is indicative of a parameter of interest. The term "information" as used herein includes any form of information (analog, digital, EM, printed, etc.), and may include one or more of: raw data, processed data, and signals.

Methods may include estimating a parameter of interest from the information, evaluating the formation using the parameter of interest, and/or performing further borehole or formation operations in dependence upon the location of the reflection points, the location of the boundary, the parameter of interest of the boundary, or other parameters of interest derived from these. In particular embodiments, a state of drilling operations, characteristics of the borehole or formation, or orientation of components of the downhole tool may be estimated using the parameter of interest, and then used in performing an operation as described above.

Aspects of the present disclosure are subject to application in various different embodiments. The sensor may be used in conjunction with a carrier such as a drill string, coiled tubing, a slickline, an e-line, a wireline, etc. The sensor may be disposed on the tool for measurement, deployed from the tool, or deployed separately (either preceding or subsequent to conveyance of the tool in the borehole. Sensors, downhole tools, and other system components may be coupled or combined with additional tools, including, e.g., some or all the information processing system, as shown in FIG. 1B, discussed in further detail below. In some general embodiments, a carrier is implemented as a tool string of a drilling system, and the acoustic wellbore logging may be characterized as "logging-while-drilling" (LWD) or "measurement-while-drilling" (MWD) operations. As described herein, "borehole" or "wellbore" refers to a single hole that makes up all or part of a drilled well. Depending on the configuration, systems shown herein may be used during drilling and/or after the wellbore has been formed, including, in some instances, after the installation of casing or production infrastructure. While a land system is shown, the teachings of the present disclosure may also be utilized in offshore or subsea applications. As described herein, "formations" refer to the various features and materials that may be encountered in a subsurface environment and surround the borehole.

Figure 1B:
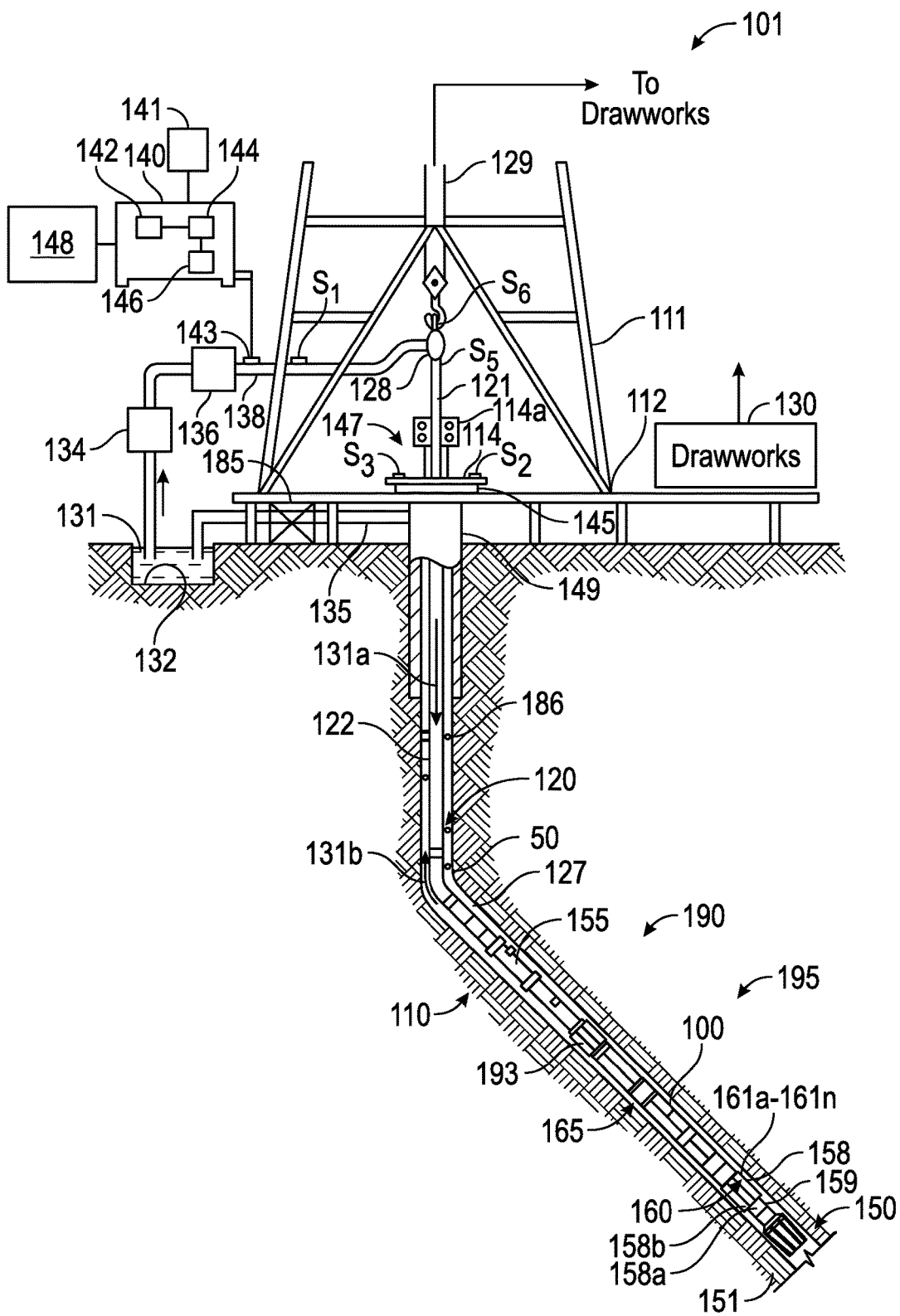

FIGS. 1A and 1B illustrate components of systems in accordance with embodiments of the present disclosure. FIG. 1A schematically illustrates a system 100 having a downhole tool 10 configured to acquire information for estimating a downhole parameter of interest (e.g., a value of a property of the formation 80, the borehole 50, or downhole fluid 90 therein) using an acoustic measurement instrument 40. A transducer module 45 may define a portion of the exterior surface of the instrument, extend from tool body 30 out into the borehole, or be trailed behind the tool body 30. The at least one measurement instrument 40 is responsive to the parameter of interest. Non-limiting examples of downhole fluids include drilling fluids, return fluids, formation fluids, production fluids containing one or more hydrocarbons, oils and solvents used in conjunction with downhole tools, water, brine, engineered fluids, and combinations thereof.

The system 100 may include a conventional derrick 60 erected on a derrick floor 70. A conveyance device (carrier 15) which may be rigid or non-rigid, may be configured to convey the downhole tool 10 into wellbore 50 in proximity to a volume of interest 80 of an earth formation 85. The carrier 15 may be a drill string, coiled tubing, a slickline, an e-line, a wireline, etc. Downhole tool 10 may be coupled or combined with additional tools e.g., some or all the information processing system (inset). Thus, depending on the configuration, the tool 10 may be used during drilling and/or after the wellbore 50 has been formed. As described herein, "borehole" or "wellbore" refers to a single hole that makes up all or part of a drilled well. While a land system is shown, the teachings of the present disclosure may also be utilized in offshore or subsea applications. The carrier 15 may include embedded conductors for power and/or data for providing signal and/or power communication between the surface and downhole equipment (e.g., a seven conductor cable). The carrier 15 may include a bottom hole assembly, which may include a drilling motor for rotating a drill bit.

Downhole fluid (e.g., drilling fluid, or 'mud') 90 may be present between the formation 85 and the downhole tool 10. A surface control system 65 receives signals from acoustic measurement instrument(s) 40 and other sensors used in the system 100 and processes such signals according to programmed instructions provided to the surface control system 65. The surface control system 65 may display desired parameters and other information on a display/monitor that is utilized by an operator. The surface control system 65 may further communicate with a downhole control system 20 at a suitable location on downhole tool 10. The surface control system 65 may process data relating to the operations and data from the sensors 40, and may control one or more downhole operations performed by system 100.

In one embodiment, electronics 30 associated with sensors 40 may be configured to record and/or process the information obtained. Certain embodiments of the present disclosure may be implemented with a hardware environment that includes an information processor 17, an information storage medium 13, an input device 11, processor memory 9, and may include peripheral information storage medium 19. The hardware environment may be in the well, at the rig, or at a remote location. Moreover, the several components of the hardware environment may be distributed among those locations. The input device 11 may be any data reader or user input device, such as data card reader, keyboard, USB port, etc. The information storage medium 13 stores information provided by the detectors. Information storage medium 13 may include any non-transitory computer-readable medium for standard computer information storage, such as a USB drive, memory stick, hard disk, removable RAM, EPROMs, EAROMs, flash memories and optical disks or other commonly used memory storage system known to one of ordinary skill in the art including Internet based storage. Information storage medium 13 stores a program that when executed causes information processor 17 to execute the disclosed method. Information storage medium 13 may also store the formation information provided by the user, or the formation information may be stored in a peripheral information storage medium 19, which may be any standard computer information storage device, such as a USB drive, memory stick, hard disk, removable RAM, or other commonly used memory storage system known to one of ordinary skill in the art including Internet based storage. Information processor 17 may be any form of computer or mathematical processing hardware, including Internet based hardware. When the program is loaded from information storage medium 13 into processor memory 9 (e.g. computer RAM), the program, when executed, causes information processor 17 to retrieve detector information from either information storage medium 13 or peripheral information storage medium 19 and process the information to estimate a parameter of interest. Information processor 17 may be located on the surface or downhole.

The term "information" as used herein includes any form of information (analog, digital, EM, printed, etc.). As used herein, a processor is any information processing device that transmits, receives, manipulates, converts, calculates, modulates, transposes, carries, stores, or otherwise utilizes information. In several non-limiting aspects of the disclosure, an information processing device includes a computer that executes programmed instructions for performing various methods. These instructions may provide for equipment operation, control, data collection and analysis and other functions in addition to the functions described in this disclosure. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on.

To perform the measurements during a single trip, the tool may use a high bandwidth transmission to transmit the information acquired by detectors 20, 30 to the surface for analysis. For instance, a communication line for transmitting the acquired information may be an optical fiber, a metal conductor, or any other suitable signal conducting medium. It should be appreciated that the use of a "high bandwidth" communication line may allow surface personnel to monitor and control operations in "near real-time."

One point of novelty of the system illustrated in FIG. 1A is that the surface control system 65 and/or the downhole control system 20 are configured to perform certain methods (discussed below) that are not in the prior art. A surface control system or downhole control system may be configured to control the tool described above and any incorporated sensors and to estimate a parameter of interest according to methods described herein.

Aspects of the present disclosure are subject to application in various different embodiments. In some general embodiments, carrier 15 is implemented as a tool string of a drilling system, and measurements taken in the borehole may be characterized as "logging-while-drilling" (LWD) or "measurement-while-drilling" (MWD) operations.

FIG. 1B shows an exemplary embodiment of an MWD system for evaluation of an earth formation using measurements from an acoustic measurement tool. The system 101 includes a carrier 111 that is shown disposed in a wellbore or borehole 50 that penetrates at least one earth formation 195. The system 101 also includes a tool 110 configured for taking acoustic measurements in the borehole.

FIG. 1B shows a drill string 120 including a bottomhole assembly (BHA) 190 conveyed in the borehole 50 as the carrier. The drilling system 101 includes a conventional derrick 111 erected on a platform or floor 112 which supports a rotary table 114 that is rotated by a prime mover, such as an electric motor (not shown), at a desired rotational speed. A tubing (such as jointed drill pipe 122), having the drilling assembly 190, attached at its bottom end extends from the surface to the bottom 151 of the borehole 50. A drill bit 150, attached to drilling assembly 190, disintegrates the geological formations when it is rotated to drill the borehole 50. The drill string 120 is coupled to a drawworks 130 via a Kelly joint 121, swivel 128 and line 129 through a pulley. Drawworks 130 is operated to control the weight on bit ("WOB"). The drill string 120 may be rotated by a top drive (not shown) instead of by the prime mover and the rotary table 114. Alternatively, a coiled-tubing may be used as the tubing 122. A tubing injector 114a may be used to convey the coiled-tubing having the drilling assembly attached to its bottom end. The operations of the drawworks 130 and the tubing injector 114a are known in the art and are thus not described in detail herein.

It should be understood that embodiments of the present disclosure are well suited for use in wells having various configurations including horizontal wells, deviated wells, slanted wells, multilateral wells and so on. Accordingly, use of directional terms herein (e.g., above, below, upper, lower, upward, downward, topmost, lowermost, uphole, downhole, etc) refer to the direction of travel along the borehole either toward or away from the surface, with the upward direction being toward the surface and the downward direction being away from the surface.

A suitable drilling fluid 131 (also referred to as the "mud") from a source 132 thereof, such as a mud pit, is circulated under pressure through the drill string 120 by a mud pump 134. The drilling fluid 131 passes from the mud pump 134 into the drill string 120 via a discharger 136 and the fluid line 138. The drilling fluid 131a from the drilling tubular discharges at the borehole bottom 151 through openings in the drill bit 150. The returning drilling fluid 131b circulates uphole through the annular space 127 between the drill string 120 and the borehole 50 and returns to the mud pit 132 via a return line 135 and drill cutting screen 185 that removes the drill cuttings 186 from the returning drilling fluid 131b. A sensor S1 in line 138 provides information about the fluid flow rate. A surface torque sensor S2 and a sensor S3 associated with the drill string 120 respectively provide information about the torque and the rotational speed of the drill string 120. Tubing injection speed is determined from the sensor S5, while the sensor S6 provides the hook load of the drill string 120.

Well control system 147 is placed at the top end of the borehole 50. The well control system 147 includes a surface blow-out-preventer (BOP) stack 115 and a surface choke 149 in communication with a wellbore annulus 127. The surface choke 149 can control the flow of fluid out of the borehole 50 to provide a back pressure as needed to control the well.

In some applications, the drill bit 150 is rotated by only rotating the drill pipe 122. However, in many other applications, a downhole motor 155 (mud motor) disposed in the BHA 190 also rotates the drill bit 150. The rate of penetration (ROP) for a given BHA largely depends on the WOB or the thrust force on the drill bit 150 and its rotational speed.

A surface control unit or controller 140 receives signals from the downhole sensors and devices via a sensor 143 placed in the fluid line 138 and signals from sensors S1-S6 and other sensors used in the system 101 and processes such signals according to programmed instructions provided to the surface control unit 140. The surface control unit 140 displays drilling parameters and other parameters of interest related to the borehole, formation, and drilling operations, and other information on a display/monitor 141 that is utilized by an operator to control the drilling operations. The surface control unit 140 may be a computer-based unit that may include a processor 142 (such as a microprocessor), a storage device 144, such as a solid-state memory, tape or hard disc, and one or more computer programs 146 in the storage device 144 that are accessible to the processor 142 for executing instructions contained in such programs. The surface control unit 140 may further communicate with a remote control unit 148. The surface control unit 140 may process data relating to the drilling operations, data from the sensors and devices on the surface, and data received from downhole; and may control one or more operations of the downhole and surface devices. The data may be transmitted in analog or digital form.

The BHA 190 may include a tool 110 configured for performing acoustic measurements. The BHA 190 may also contain other formation evaluation sensors or devices (also referred to as measurement-while-drilling ("MWD") or logging-while-drilling ("LWD") sensors) determining resistivity, density, porosity, permeability, acoustic properties, nuclear-magnetic resonance properties, formation pressures, properties or characteristics of the fluids downhole and other desired properties of the formation 195 surrounding the BHA 150. For convenience, all such sensors are generally denoted herein by numeral 165. The BHA 190 may further include a variety of other sensors and devices 159 for determining one or more properties of the BHA 190, such as vibration, bending moment, acceleration, oscillations, whirl, stick-slip, weight-on-bit, fluid flow rate, pressure, temperature, rate of penetration, azimuth, tool face, drill bit rotation, etc.

The BHA 190 may include a steering apparatus or tool 158 for steering the drill bit 50 along a desired drilling path. In one aspect, the steering apparatus may include a steering unit 160, having a number of force application members 161a-161n. The force application members may be mounted directly on the drill string, or they may be at least partially integrated into the drilling motor. In another aspect, the force application members may be mounted on a sleeve, which is rotatable about the center axis of the drill string. The force application members may be activated using electro-mechanical, electro-hydraulic or mud-hydraulic actuators. In yet another embodiment the steering apparatus may include a steering unit 158 having a bent sub and a first steering device 158a to orient the bent sub in the wellbore and the second steering device 158b to maintain the bent sub along a selected drilling direction. The steering unit 158, 160 may include near-bit inclinometers and magnetometers.

The drilling system 101 may include sensors, circuitry and processing software and algorithms for providing information about desired drilling parameters relating to the BHA, drill string, the drill bit and downhole equipment such as a drilling motor, steering unit, thrusters, etc. Many current drilling systems, especially for drilling highly deviated and horizontal wellbores, utilize coiled-tubing for conveying the drilling assembly downhole. In such applications a thruster may be deployed in the drill string 120 to provide the required force on the drill bit.

Exemplary sensors for determining drilling parameters include, but are not limited to drill bit sensors, an RPM sensor, a weight on bit sensor, sensors for measuring mud motor parameters (e.g., mud motor stator temperature, differential pressure across a mud motor, and fluid flow rate through a mud motor), and sensors for measuring acceleration, vibration, whirl, radial displacement, stick-slip, torque, shock, vibration, strain, stress, bending moment, bit bounce, axial thrust, friction, backward rotation, BHA buckling, and radial thrust. Sensors distributed along the drill string can measure physical quantities such as drill string acceleration and strain, internal pressures in the drill string bore, external pressure in the annulus, vibration, temperature, electrical and magnetic field intensities inside the drill string, bore of the drill string, etc. Suitable systems for making dynamic downhole measurements include COPILOT, a downhole measurement system, manufactured by BAKER HUGHES INCORPORATED.

The drilling system 101 can include one or more downhole processors at a suitable location such as 193 on the BHA 190. The processor(s) can be a microprocessor that uses a computer program implemented on a suitable non-transitory computer-readable medium that enables the processor to perform the control of system 101 and processing of information, such as information from the sensors. The non-transitory computer-readable medium may include one or more ROMs, EPROMs, EAROMs, EEPROMs, flash memories, RAMs, hard drives and/or optical disks. Other equipment such as power and data buses, power supplies, and the like will be apparent to one skilled in the art. In one embodiment, the MWD system utilizes mud pulse telemetry to communicate data from a downhole location to the surface while drilling operations take place. The surface processor 142 can process the surface measured data, along with the data transmitted from the downhole processor, to evaluate the formation.

Surface processor 142 or downhole processor 193 may also be configured to control steering apparatus 158, mud pump 134, drawworks 130, rotary table 114, downhole motor 155, other components of the BHA 190, or other components of the drilling system 101. Surface processor 142 or downhole processor 193 may be configured to control sensors described above and to estimate a parameter of interest according to methods described herein.

Control of these components may be carried out using one or more models using methods described below. For example, surface processor 142 or downhole processor 193 may be configured to modify drilling operations i) autonomously upon triggering conditions, ii) in response to operator commands, or iii) combinations of these. Such modifications may include changing drilling parameters, steering the drillbit (e.g., geosteering), altering the drilling fluid program, activating well control measures, and so on. Control of these devices, and of the various processes of the drilling system generally, may be carried out in a completely automated fashion or through interaction with personnel via notifications, graphical representations, user interfaces and the like. Reference information accessible to the processor may also be used. In some general embodiments, surface processor 142, downhole processor 193, or other processors (e.g. remote processors) may be configured to operate the evanescent tool 110 to generate an evanescent wave and measure signals.

The system 101 may include any number of downhole tools for various processes including formation drilling, geosteering, and formation evaluation (FE) for making electrical measurements versus depth and/or time of one or more physical properties in or around a borehole, including a volume of interest of the formation intersected by the borehole. The tool 110 may be included in or embodied as a BHA, drillstring component or other suitable carrier.

While a drill string 120 is shown as a conveyance device for tool 110, it should be understood that embodiments of the present disclosure may be used in connection with tools conveyed via rigid (e.g. jointed tubular or coiled tubing) as well as non-rigid (e.g. wireline, slickline, e-line, etc.) conveyance systems. The drilling system 101 may include a bottomhole assembly and/or sensors and equipment for implementation of embodiments of the present disclosure on either a drill string or a wireline.

Mathematical models, look-up tables, or other models representing relationships between the signals and the parameter values may be used to characterize the formation, the borehole location, or operations in the formation; optimize one or more operational parameters of a production or development; and so on. The system may carry out these actions through notifications, advice, and/or intelligent control. Various types of downhole parameters may be determined using measurements in accordance with the present disclosure and making evaluations in accordance with embodiments disclosed herein.

U.S. Pat. No. 7,035,165 to Tang having the same assignee as the present disclosure and the contents of which are incorporated herein by reference discloses a method in which a plurality of multicomponent acoustic measurements are obtained at a plurality of depths and for a plurality of source-receiver spacings on the logging tool. An orientation sensor on the logging tool, such as a magnetometer, may be used for obtaining an orientation measurement indicative of an orientation of the logging tool. The multicomponent measurements are rotated to a fixed coordinate system (such as an earth based system defined with respect to magnetic or geographic north) using the orientation measurement, giving rotated multicomponent measurements. The rotated multicomponent measurements are processed for providing an image of the subsurface.

U.S. Pat. No. 8,055,448 B2 to Mathiszik et al., having the same assignee as the present disclosure and the contents of which are incorporated herein by reference, discloses further improvements in MWD acoustic imaging. A downhole acoustic logging tool is used for generating a guided borehole wave that propagates into the formation as a body wave, reflects from an interface and is converted back into a guided borehole wave. Guided borehole waves resulting from reflection of the body wave are used to image a reflector. U.S. Pat. No. 8,811,114 B2 to Geerits et al., having the same assignee as the present disclosure and the contents of which are incorporated herein by reference, discloses further improvements in MWD acoustic imaging.

Figure 2A:
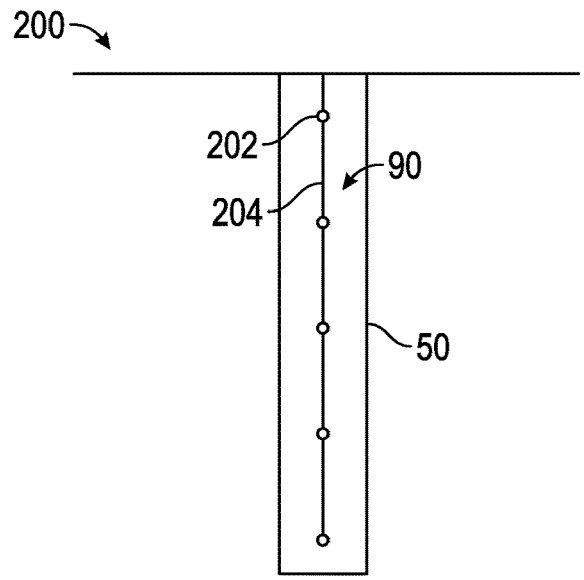
FIGS. 2A-2C are schematic diagrams illustrating operation of device embodiments including acoustic sensors in accordance with embodiments of the present disclosure.
Figure 2B:
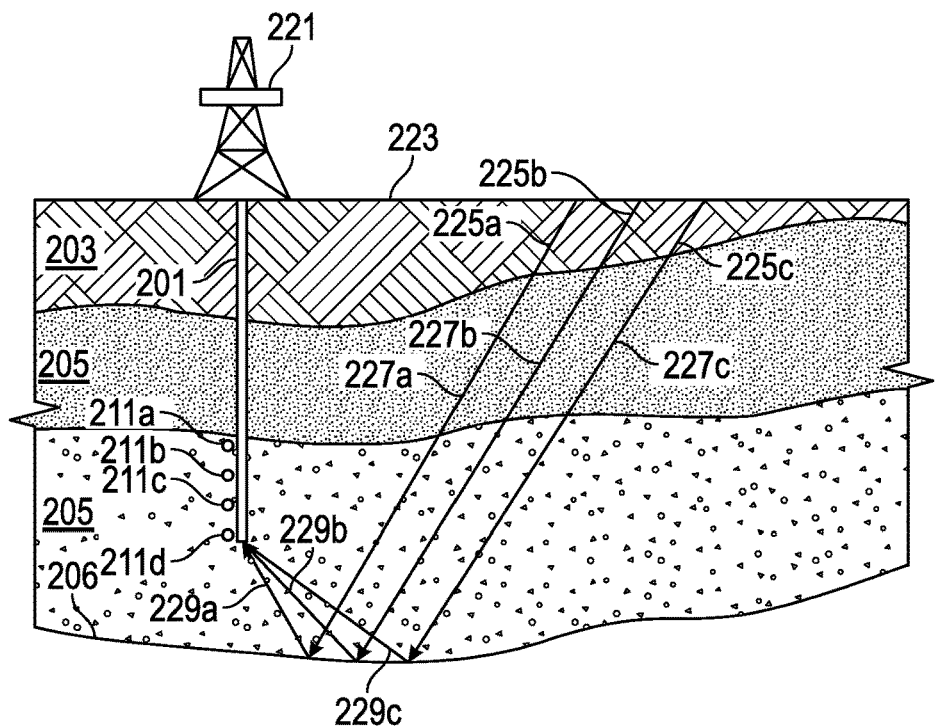
Figure 2C:
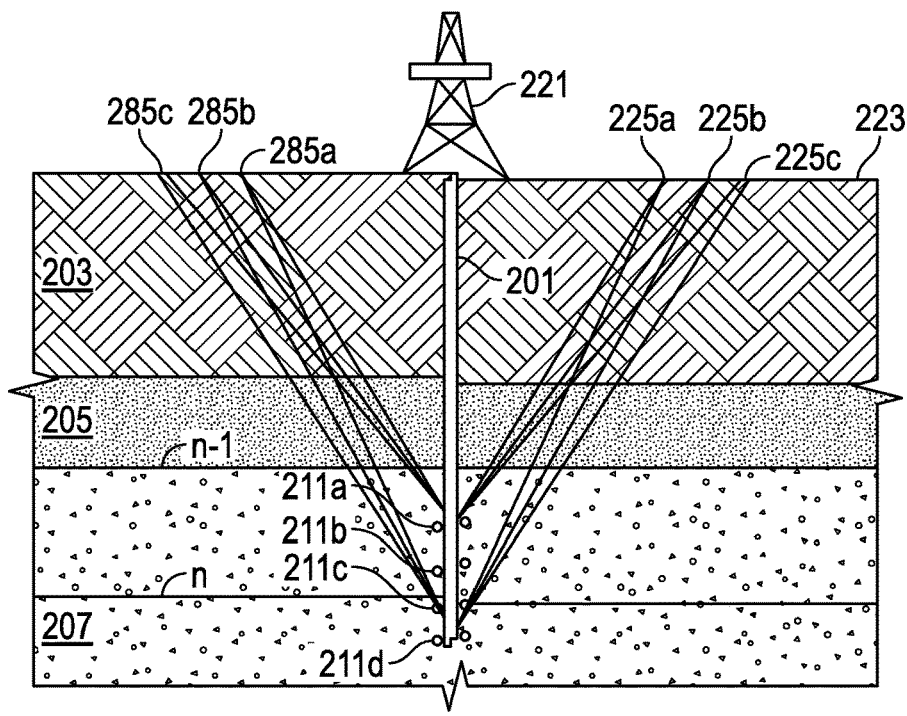

FIGS. 2A-2C are schematic diagrams illustrating operation of device embodiments including acoustic sensors in accordance with embodiments of the present disclosure. In general device embodiments, a sensor in accordance to the present disclosure may be implemented as a probe and installed in a downhole fluid. This installation may be permanent or temporary, and may involve being suspended in a fluid by individual or common tether, free-floating, or being attached to the wellbore. Thus, the probe may be stationary or in motion after installation.

Referring to FIG. 2A, system 200 comprises a plurality of probes 202 suspended in a fluid 90 in a borehole 50 by tether 204. An exterior of the probe housing may be immersed in the downhole fluid during installation. In alternative embodiments, the probe 202 may be retractable; for instance, when in operation the probe may be inserted or placed into the downhole fluid in the borehole and then retracted for cleaning or to allow further operations in the borehole.

FIG. 2B is a schematic illustration showing VSP measurement acquisition in accordance with embodiments of the present disclosure. Rig 221 resides at the earth surface 223. This may be a drilling rig or it may be a mast rig which conveys a wireline into a borehole 201. The borehole 201 penetrates layers 203, 205. Positioned in the borehole 201 are seismic sensors denoted by 211 $a$, 211 $b$, 211 $c$, 211 $d$ and so on. Each of the sensors may be a sensor (e.g., a hydrophone) in accordance with embodiments of the present disclosure. Data for a single offset VSP is typically acquired using a single seismic source such as 225$a$ at the surface (or within a body of water at the surface). In reference to FIG. 2B, a surface of a body of water may be considered to be an earth surface. An exemplary raypath which depicts the propagation of seismic energy from the source 225$a$ to a detector 211 $d$ is depicted by the ray 227$a$ that is reflected from the bottom of layer 205 at the boundary 206 and reaches the receiver 211$d$ along the raypath denoted by 229$a$.

In one typical type of VSP operation, data resulting from operation of a source at a single position such as 225$a$ is recorded in each of the receivers 211 $a$, 211 $b$, 211 $c$, 211 $d$, etc. in the borehole. Analysis of the reflected data can provide information about the seismic velocities in the subsurface and the configuration of the layer boundaries. In a walkaway VSP, this process is repeated for operation of the source at a plurality of source positions such as 225$b$, 225$c$. Acquisition of data from a plurality of source positions at a plurality of detectors provides a redundant sampling of the subsurface region, making it possible to determine the velocity of the subsurface based on the travel-times for the rays between each of the sources and each of the receivers. This determination of velocity using travel-times is called "tomographic inversion" and numerous processing packages are available commercially and as open source software (e.g., OpenTOAST) that perform this tomographic inversion of seismic travel-time data. Processing of VSP measurements to characterize the formation is a well-developed field. See, for example, U.S. Pat. No. 7,751,279 to Aronstam, and U.S. Pat. No. 7,751,279 to Zhao et al., hereby incorporated by reference in its entirety.

FIG. 2C shows a simulated geometry of a surface seismic survey. A vertical borehole has been assumed, the sources have been "reflected" in the borehole to simulated receiver locations on the surface 285 $a$, 285 $b$, 285 $c$. Similarly, the raypaths have also been reflected to give simulated raypaths on the left side of the borehole. In operation, methods include deploying in a borehole an array of seismic receivers as described herein and recording seismic signals in the array of receivers responsive to an activation of a seismic source at a plurality of positions on the surface of the earth. For walkaway techniques, the method further includes estimating, from travel times of seismic waves from the plurality of source positions to the plurality of receivers, velocities of vertically propagating seismic waves in a plurality of intervals, and two anisotropy parameters $\varepsilon$ and $\delta$ related to a normal moveout curve of compressional waves for the plurality of intervals. The estimated vertical velocities and the estimated interval anisotropy parameters may be used to further process surface seismic data to give a seismic image in depth for the purpose of interpretation. For a multi-azimuthal walkaway or 3D VSP geometry, the method may further include estimating, from travel times of seismic waves from the plurality of source positions around the well to the plurality of receivers, velocities of vertically propagating seismic waves in a plurality of intervals, and five orthorhombic anisotropy parameters $\varepsilon 1$, $\varepsilon 1$, $\delta 1$, $\delta 2$ and $\delta 3$ related to a normal moveout velocity of compressional waves for the plurality of intervals. The estimated vertical velocities and the estimated anisotropy parameters may be used to further process surface seismic data to give a seismic image in depth for the purpose of interpretation. See, for example, U.S. Pat. No. 8,750,074 to Blias, hereby incorporated by reference in its entirety.

Downhole Fiber Optic Hydrophone

Figure 3A:
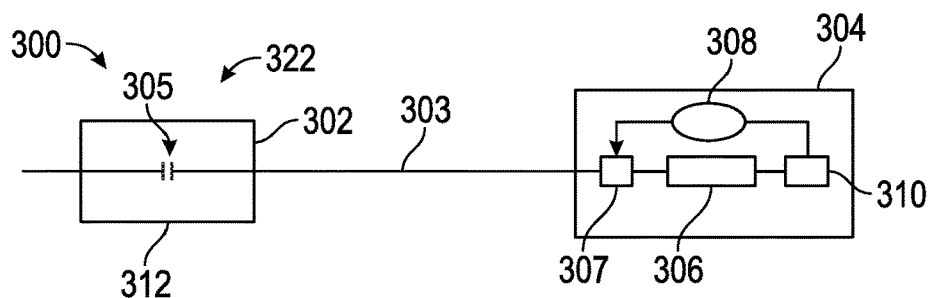
FIG. 3A shows a schematic diagram illustrating an acoustic sensor in accordance with embodiments of the present disclosure.

FIG. 3A shows a schematic diagram illustrating an acoustic sensor in accordance with embodiments of the present disclosure. The sensor 300 is part of a measurement instrument configured to be conveyed in a borehole 50. Sensor 300 may include a pressure transducer 302 and a interrogator 304. The pressure transducer 302 comprises a transducer body 312 having a portion (e.g., face 322) immersed in the downhole fluid. The transducer body 312 may be mechanically de-coupled from the sensor tool body (drill collar, wireline, etc.) in order to insulate the transducer body 312 from structure-borne sound transmission. An acoustic pressure signal is propagated via the downhole fluid coupled with the transducer. In some embodiments, some (or all) of the instrument may protrude from the tool body into the borehole. Transducer 302 is configured to convert an acoustic pressure signal within a nominal borehole pressure incident on the transducer to an alternating strain on an optical medium (e.g., optical fiber 303).

Fiber 303 includes fiber Bragg gratings ('FBG') 305. These fiber Bragg gratings are a type of distributed Bragg reflector constructed in a segment of optical fiber (e.g., by using pulses from a femtosecond laser) that reflects light centered about a particular wavelength, such as, for example, by creating a periodic variation in the refractive index of the fiber core and thus generating a wavelength specific dielectric mirror. FBG 305 reflects a small spectral portion of electromagnetic radiation (e.g., light) propagating in the optical fiber 303, allowing a remaining portion to travel through.

The electromagnetic radiation is provided by an energy source 308, such as a light source configured to provide light for the sensors via the optical fiber. As one example, the energy source may be a tunable laser light source that is configured to provide a light having a wavelength that sweeps across a range of wavelengths at a selected rate, but the energy source may be any tunable light source or a swept-wavelength light source that covers a range of wavelengths including visible, ultraviolet, and infrared light. As another example, a light emitting diode or superluminescent diode may be optically coupled to the fiber 303 to provide an infrared light beam. The energy source 308 may optionally be incorporated as part of the interrogator 304, as shown in FIG. 3A.

The central wavelength of the reflected spectral portion ('reflected spectrum' or 'reflection spectrum') is responsive to physical parameters on the fiber, including, particularly, strain along the axis of the fiber. Due to the configuration of the transducer, strain on the fiber is representative of the pressure. Thus, the central wavelength of the spectrum changes with changes in pressure on the transducer, and is indicative of the acoustic pressure signal on the sensor.

The optical fiber 303 may run through the transducer 302 and into the interrogator 304. Interrogator 304 (implemented using, e.g., one or more photodetectors, charge-coupled devices, optical-electrical converters, or the like) is optically coupled to the fiber 303 and detects electromagnetic signals (e.g., light) received from the fiber.

A light coupling or separation mechanism 307 such as an optical circulator or fiber optic splitter may be used to couple or separate optical signals travelling in opposite directions in the fiber 303, such as, for example, by providing light from the light source 308 to the transducer 302 via the fiber 303, and sending light returning on the fiber from the transducer 302 to spectral detector 306. Spectral detector 306 generates measurement information indicative of the pressure signal based on electromagnetic signals responsive to partial reflection of the electromagnetic energy.

Sensor 300 may include circuitry 310 for making measurements using the interrogator 304. Circuitry 310 may include a control unit operatively connected to source 308 and spectral detector 306. Circuitry 310 may be implemented, at least in part, as the at least one processor described above with reference to FIGS. 1A & 1B, or may be an additional processor or other supporting circuitry. In some implementations, portions of circuitry 310 may be located at the instrument, at other locations in the tool (including, for example, in other subs), or at the surface.

In operation, the instrument may be controlled by circuitry 310, including the control unit (e.g., a processor), which actuates the energy source 308 while the portion of the transducer (e.g., face 322) is immersed in the downhole fluid and receives measurement information (e.g., data) from spectral detector 306.

Interrogator 304 is thus configured to generate acoustic measurement information responsive to received electromagnetic radiation (e.g., the reflected spectrum) transmitted through the medium. Alternatively, the central wavelength may be detected using an optical detector at the opposite end of the fiber detecting or the remaining portion of the original spectrum. A time-varying value of the central wavelength may be used to generate a time-varying value of the acoustic pressure signal. Spectral detector 306 may be implemented, for example, using one or more photo detectors corresponding to the desired wavelength.

Figure 3B:
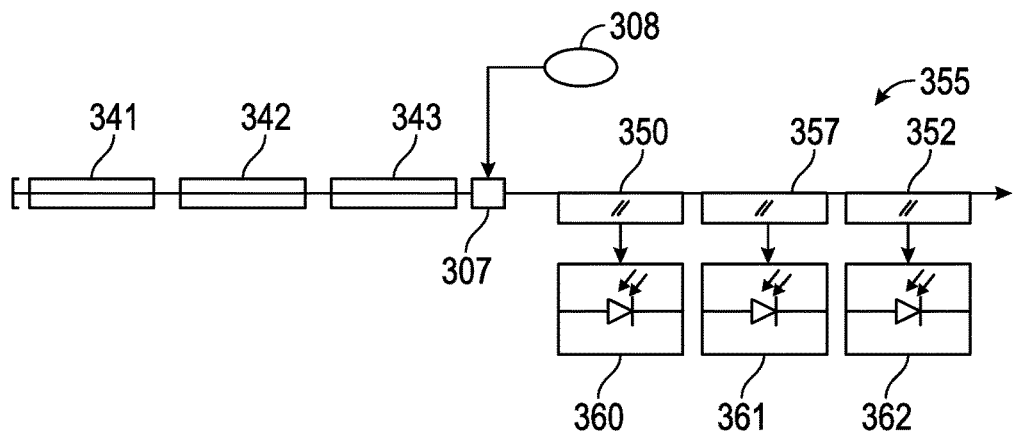
FIG. 3B illustrates a sensor including multiple pressure transducers on a single fiber.

FIG. 3B illustrates a sensor including multiple pressure transducers 341, 342, 343 on a single fiber. The section of the fiber corresponding to each transducer includes a unique Bragg grating. The characteristic wavelength of each of the gratings is spaced from those of the remaining gratings, such that the signal for a particular transducer may be recovered. A spectral demultiplexer 355, such as a set of additional Bragg gratings on the detector side, separates the signals to a corresponding set of photodetectors 360, 361, 362, with one Bragg grating and one photodetector for each transducer. This configuration allows the simultaneous interrogation of two or more sensors.

Pressure transducer 302 is configured to convert a low-amplitude, high-frequency acoustic pressure signal within a nominal borehole pressure incident on the transducer to an alternating strain on the optical medium along an axis of the medium via movement of a flexing member while suppressing conversion of low-frequency signals and constant pressure into strain of the optical medium.

High-Offset Sensor Transducer

Figure 4A:
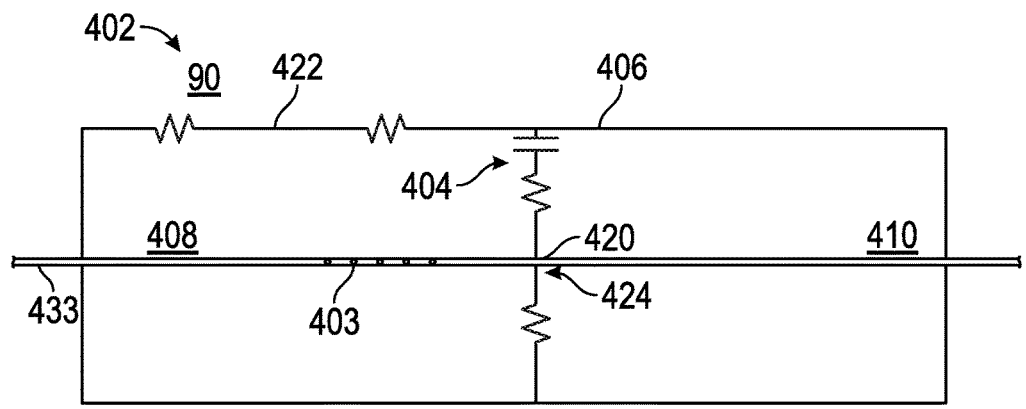
FIGS. 4A-4H illustrate transducers in accordance with embodiments of the present disclosure.

FIGS. 4A-4H illustrate transducers in accordance with embodiments of the present disclosure. Referring to FIG. 4A, transducer 400 includes a transducer body 406 containing a first reservoir 408 and a second reservoir 410. The pressure transducer 400 comprises an interface 424 between the reservoirs. Body 406 and interface 424 may be fabricated from silicon, glass, crystalline structures, composites, or the like, such as, for example, by bonding together wafers, by subtractive manufacture (e.g., etching, laser ablation), etc. Each reservoir is filled with the same type of reservoir fluid (e.g., silicone oil), and the interface 424 includes at least one opening providing for communication of the reservoir fluid between the first reservoir 408 and a second reservoir 410. The opening is a capillary 404. Other implementations may use more than one capillary, or may use a different type of opening.

The interface 424 also includes a flexing member, implemented as flexible membrane 420. Flexible membrane 420 may be made of a polymer bonded to the body (e.g., polyvinylidene difluoride ('PVDF')). In other implementations flexing member be an additional wafer bonded in place, or may be created through subtractive manufacture of the body 406. A segment of optical fiber 403 is attached to the membrane which includes a FBG proximate to the point of attachment. The fiber may be attached using an adhesive, welding, soldering, or splicing process. The optical fiber may traverse the membrane in the center in normal direction and is attached to the membrane at the boundary point. A second interface separates one of the reservoirs 408 and the downhole fluid 90. The second interface comprises a second flexing member 422 responsive to the high-frequency acoustic pressure signal incident on the transducer.

The FBG may be written into the fiber using a femtosecond laser. This allows imprinting of various grating shapes by modifying the grating period and depth, and hence to realize apodized, pi-shifted, and chirped gratings. Furthermore, this process can be applied to standard optical fibers, in contrast to UV light-based methods that require photo-sensitive fiber cores.

Acoustic signals in the downhole fluid are incident on membrane 422. The fluid of reservoir 408 behind (interior to) the membrane 422 experiences a high ambient pressure from the downhole fluid, but this pressure is equalized across membrane 424 via the capillary 404. The fluid response interior to the transducer body 406, in the presence of the capillary 404, to constant or low-frequency pressure is to equalize through the capillary without appreciable response on (movement of) membrane 420. Capillary 404 may therefore be said to filter out the low frequency signal. In contrast, a high frequency signal incident on membrane 422 causes a symmetrical response on membrane 420, with the corresponding strain signal generated on the fiber. With elevated pressures equalized across all fluids, the response on membrane 420, and hence the fiber, exhibits remarkable fidelity (e.g., on the order of less than 10 percent per MPa differential pressure, less than 5 percent per MPa differential pressure, or down to and including 1 percent per MPa differential pressure or better). The transducer body 406 may be mechanically de-coupled from the sensor tool body (drill collar, wireline, etc.) in order to insulate the transducer body 406 from structure-borne sound transmission.

The collective result of these features is that the pressure transducer is configured to fluid-mechanically filter low-frequency ambient pressure noise using bypass flow of the reservoir fluid through the opening via pressure equalization. This is achieved through fluid bypass with a cross section configured to compensate by slowly carrying differential pressure between the two reservoirs. In FIG. 4A, the bypass is realized by introducing capillary 404 with appropriate diameter and length between the two silicon-oil filled reservoirs for the desired cutoff frequency (f):

$$f = \frac{r^4 \cdot \rho \cdot c^2}{16 \cdot \mu \cdot l \cdot V} \quad (1)$$

wherein
l is the length of the capillary tube;
r is the radius of the capillary tube;
V is the volume of the reservoir behind the capillary tube;
μ is the dynamic viscosity of the fluid;
ρ is the fluid density; and
c is the speed of sound of the fluid.

Figure 4B:
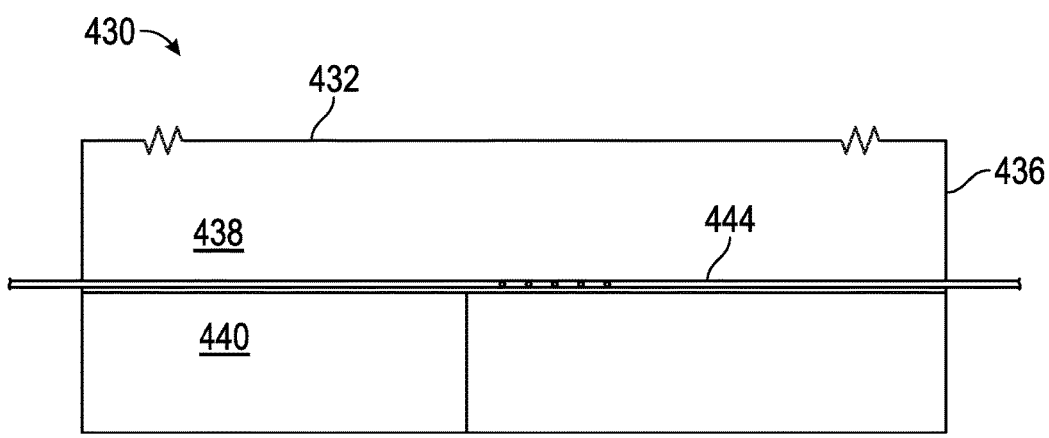
Figure 4C:
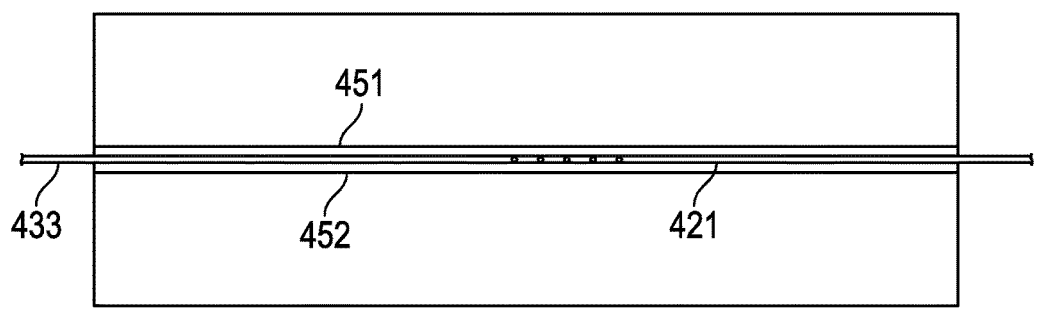

FIGS. 4B & 4C illustrate another transducer in accordance with embodiments of the present disclosure. FIG. 4B is a lateral view of the transducer 430. FIG. 4C is a top view of the interface 444. Transducer 430 includes a transducer body 436 containing a first reservoir 438 and a second reservoir 440. In some implementations, reservoirs 438 and 440 may be configured such that their respective maximum extents in a direction normal to the interface 444 are equal (and opposite). This configuration may result in effective compensation of pressure differences occurring at the interface due to quasi-hydrostatic pressure. The transducer body 436 may also be mechanically de-coupled from the sensor tool body (drill collar, wireline, etc.) in order to insulate the transducer body 436 from structure-borne sound transmission. The pressure transducer 430 comprises an interface 444 between the reservoirs. Each reservoir is filled with the same type of reservoir fluid (e.g., silicone oil), and the interface 444 includes two openings providing for communication of the reservoir fluid between the first reservoir 438 and a second reservoir 440. The openings comprise slits 451, 452 in the interface 444. Other implementations may additionally use a capillary, or may use more or fewer openings of various dimensions.

The flexing member 421 is implemented as a portion of the interface between a first slit 451 of the plurality and a second slit 452 of the plurality forming a bender bar. A segment of optical fiber 433 is attached (e.g., using adhesives) to the flexing member 421, and includes an FBG centered over the attachment. A second interface separates one of the reservoirs 438 and the downhole fluid 90. The second interface comprises a second flexing member 432 (e.g., a membrane) responsive to the high-frequency acoustic pressure signal incident on the transducer.

As before, acoustic signals in the downhole fluid are incident on the exterior membrane 452. Low frequency pressure is equalized across the interface via the capillary slits 451 and 452 while preventing a corresponding appreciable response on member 421, thus filtering out the low frequency pressure signal and constant pressure. Again, with elevated pressures equalized across all fluids, the response on member 421, and hence the fiber are greatly improved from traditional techniques. The bypass is realized by configuring slits 451 and 452 having appropriate dimensions between the two silicon-oil filled reservoirs for the desired cutoff frequency (f):

$$f = \frac{w^3 \cdot l \cdot \rho \cdot c^2}{24\pi \cdot \mu \cdot h \cdot V} \quad (2)$$

wherein
l is the length of the slit;
h is the height of the slit;
w is the width of the slit;
V is the volume of the reservoir behind the slit;
μ is the dynamic viscosity of the fluid;
ρ is the fluid density; and
c is the speed of sound of the fluid.

Figure 4D:
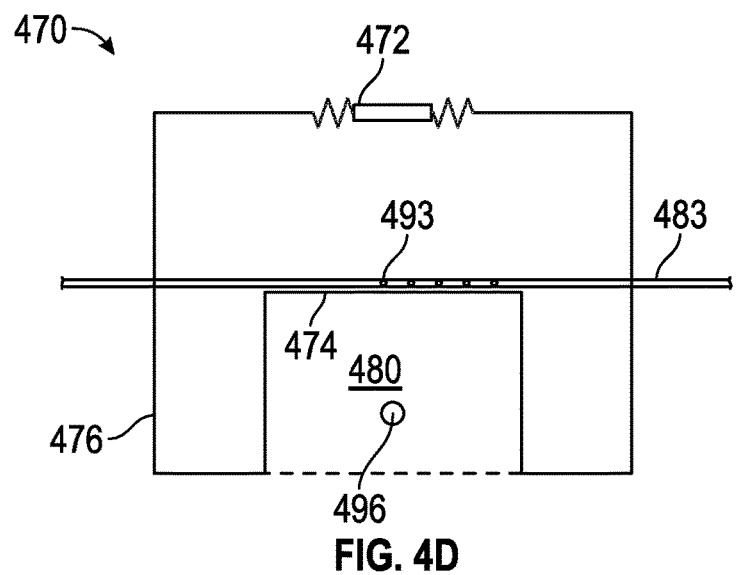
Figure 4E:
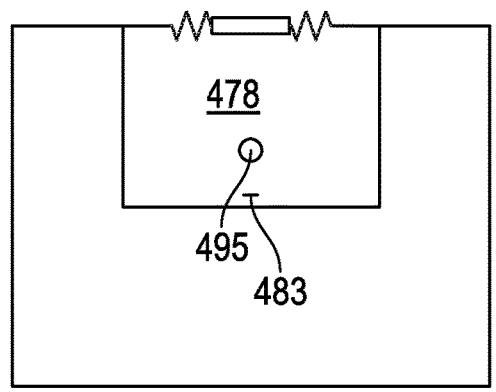
Figure 4F:
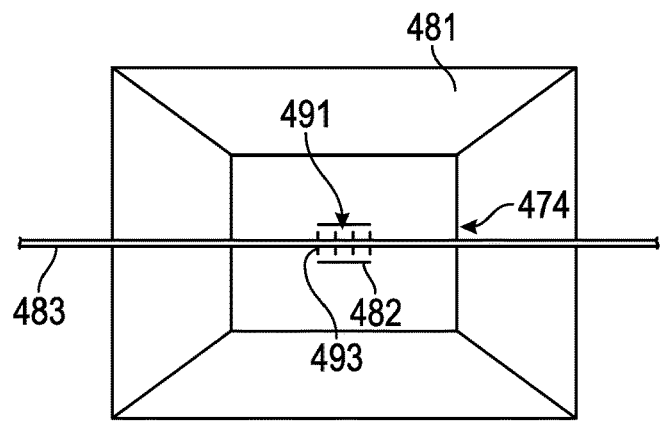

FIGS. 4D-4H illustrate another transducer in accordance with embodiments of the present disclosure. FIG. 4D is a lateral view of the transducer 470. FIG. 4E is a second lateral view of the transducer 470 perpendicular to the first view. Transducer 470 includes a transducer body 476 containing a first reservoir 478 and a second reservoir 480. Each reservoir is filled with the same type of reservoir fluid (e.g., silicone oil), and an interface 474 between the reservoirs includes openings 481 and 482 providing for communication of the reservoir fluid between the first reservoir 478 and the second reservoir 480. A second interface comprises a second flexing member 472 (e.g., a membrane) responsive to the high-frequency acoustic pressure signal incident on the transducer. FIG. 4F is a top view of the interface. A segment of optical fiber 483 is attached (e.g., using adhesives) to the flexing member 491, and includes an FBG 493 centered over the attachment, as above.

Transducer 470 represents a transducer configured for vibration compensation. As above with respect to FIGS. 4B & 4C, the maximum extent of reservoirs 478 and 480 with respect to the interface 474 in a direction normal to the interface 474 may be equal, and this configuration may result in effective compensation of pressure differences occurring at the interface due to quasi-hydrostatic pressure. In order to attain the same effect in all directions, transducer 470 may be configured such that the upper and lower reservoirs 478 and 480 may satisfy the same condition in two perpendicular and respectively perpendicular directions 494 and 495.

Figure 4G:
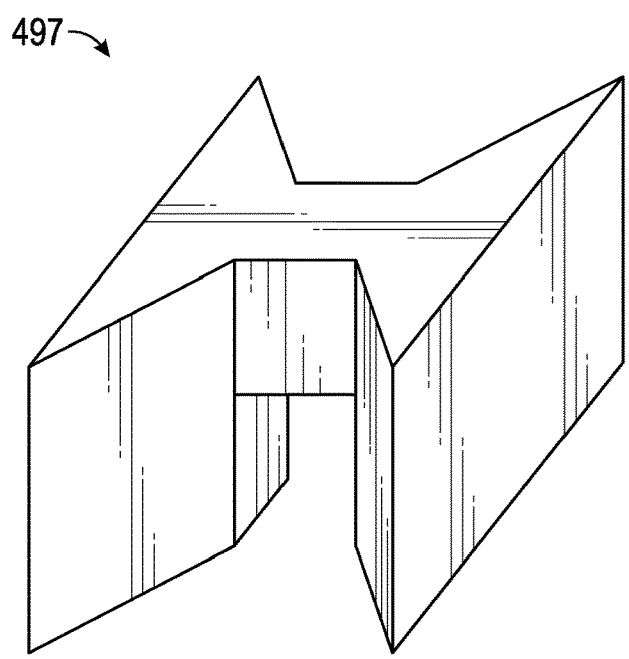
Figure 4H:
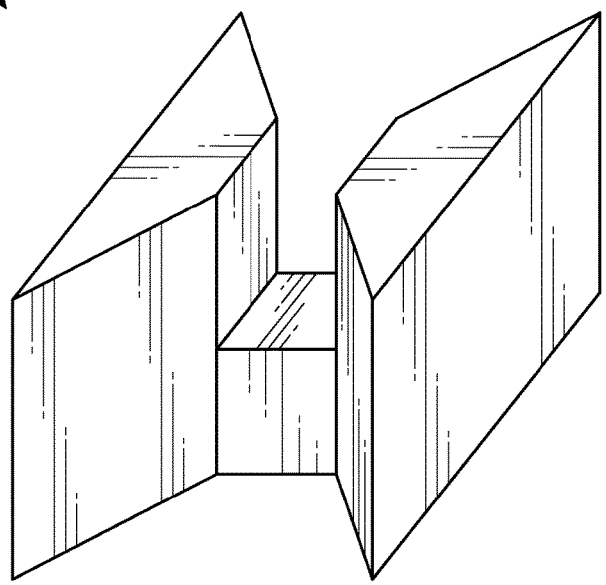

FIGS. 4G and 4H illustrate one construction of transducer 470. FIG. 4G shows a side view of upper reservoir member 497 and FIG. 4H shows a front view of lower reservoir member 498. Each reservoir is symmetric in two dimensions. The lower reservoir member 498 is configured to receive upper reservoir member 497. By rotating upper reservoir 497 by 90 degrees and coupling the reservoir members as an interlocking assembly, the transducer 470 may be constructed. The reservoir members are also configured such that the upper reservoir member 497 is substantially symmetric to the lower reservoir member 498. The upper reservoir member 497 may have substantially identical dimensions to the lower reservoir member 498 but different orientations as aligned for assembly. The volume of fluid of the reservoirs is substantially the same. Thus, the reservoirs have a shape and respective orientation which results in suppression of any acceleration-induced quasi-hydrostatic pressure signal. This is achieved by ensuring that the pressure at the flexing member is identical in both reservoirs.

Figure 5A:
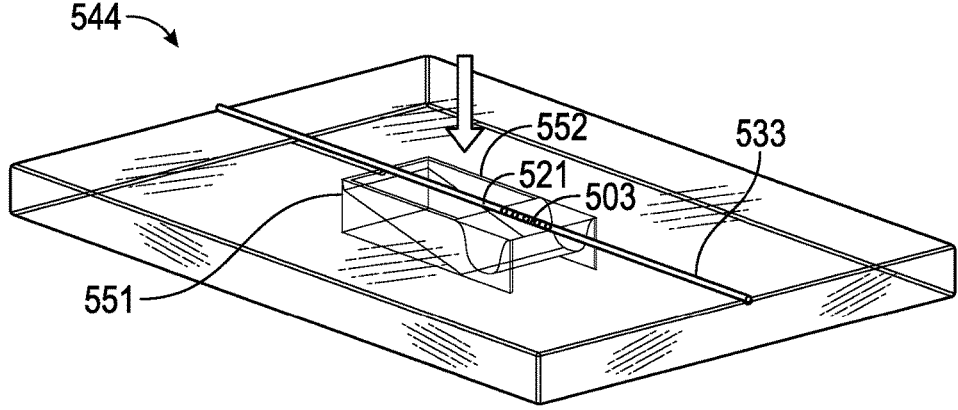
FIGS. 5A & 5B illustrate transducer components in accordance with embodiments of the present disclosure.
Figure 5B:
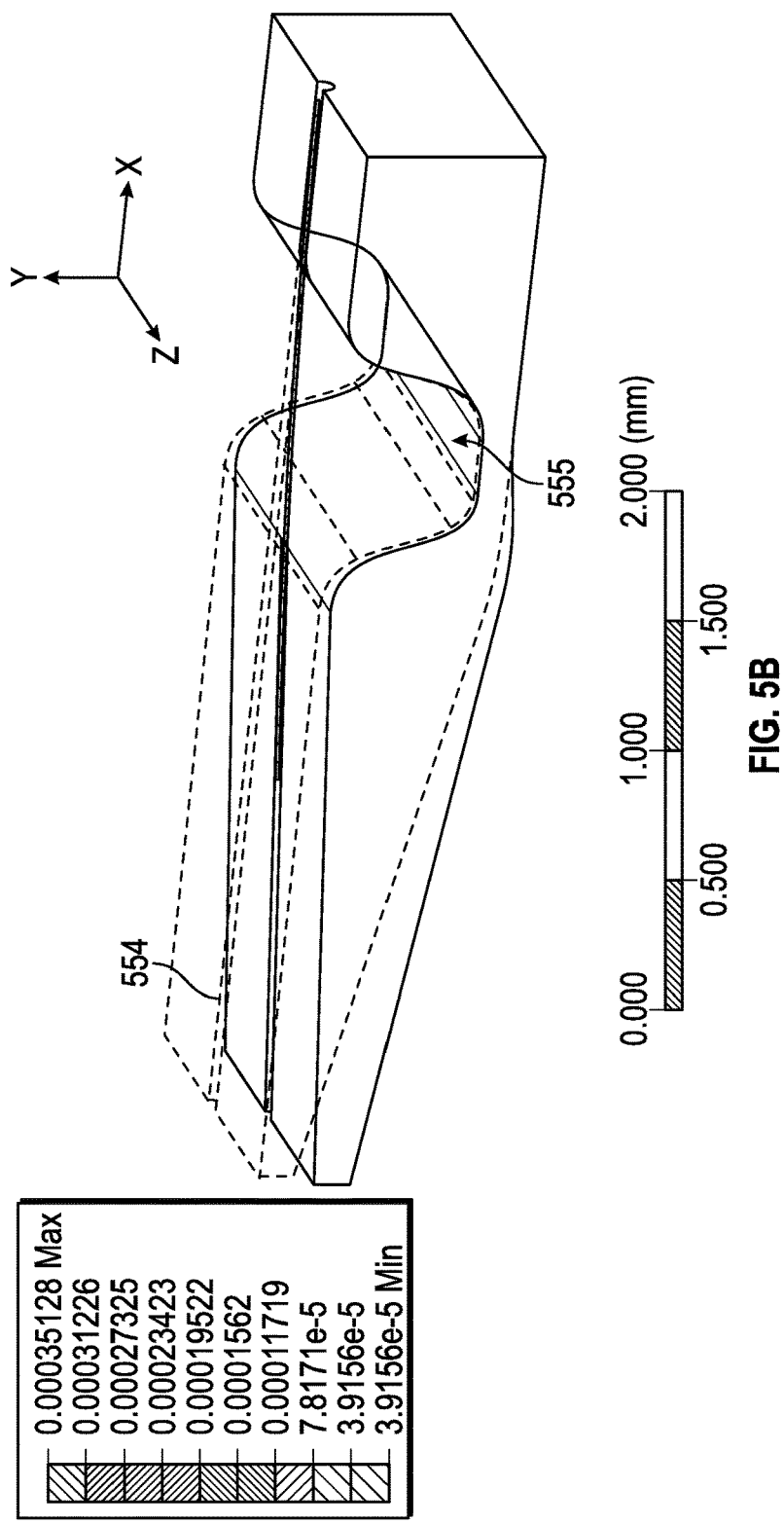

FIGS. 5A & 5B illustrate transducer components in accordance with embodiments of the present disclosure. Transducer 500 includes glass plate 544, which acts as an interface wall in a similar fashion to interface 444. An additional reservoir may be formed above the glass plate 544 by an extension of a transducer body and membranes (not shown). The pressure transducer 500 comprises a flexing member 521. The flexing member 521 is implemented as a portion of the interface between a first slit 551 of the plurality and a second slit 552 of the plurality forming a bender bar. A segment of optical fiber 533 is attached (e.g., using adhesives) to the flexing member 521. Flexural element 550 supports the flexing member 521. The flexural element includes a notch 554 in which optical fiber 533 resides and a cavity 555. The FBG 503 within the optical fiber 533 is positioned above the cavity 555 at a distance from the notch configured for maximal elastic strain within the fiber from generated leverage from the flexural element at the notch end. The wedge profile of the flexural element results in reduced mass, and thus increased fundamental frequency, with respect to other embodiments (e.g., approaching 10 kHz, or more).

Figure 6:
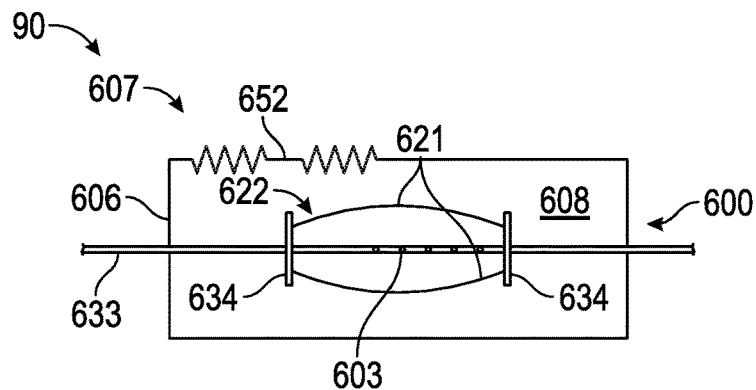
FIG. 6 illustrates another transducer in accordance with embodiments of the present disclosure.

FIG. 6 illustrates another transducer in accordance with embodiments of the present disclosure. The transducer may be implemented with a reservoir filled with a dilatant fluid. The dilatant fluid may be configured to act, responsive to the high-frequency acoustic pressure signal, as a solid transmitting the high-frequency acoustic pressure signal to the flexing member; responsive to the ambient pressure noise, the dilatant fluid may be configured to act as a liquid preventing transmission of the ambient pressure noise to the flexing member.

Transducer 600 includes a transducer body 606 containing a reservoir 608. Flexing members 622 are implemented as a plurality of biasing members 621 (e.g., springs) within the reservoir 608 which bias a plurality of wave impingement members 634 (e.g., planar discs) which are connected with a segment of optical fiber 633 (which extends through the body 606). An FBG 603 is centered between the discs 634. The optical fiber may traverse through (and be connected at) each disc 634 in the center in a normal direction. An interface 607 separates one of the reservoir 608 and the downhole fluid 90. The interface comprises an exterior membrane 652 responsive to the high-frequency acoustic pressure signal incident on the transducer.

The reservoir 608 is filled with a dilatant fluid. The dilatant fluid is configured to act, responsive to the high-frequency acoustic pressure signal, as a solid transmitting the high-frequency acoustic pressure signal to the flexing member; responsive to ambient pressure noise or constant pressure, however, the dilatant fluid is configured to act as a liquid, thus preventing transmission of the ambient pressure noise to the flexing member.

As before, acoustic signals in the downhole fluid are incident on the exterior membrane 652. Responsive the high-frequency acoustic signals passed to the reservoir 608 by the membrane 652, the dilatant fluid acts as a solid transmitting the signal to impingement members 634, which relieves strain on the fiber 633. In contrast, low-frequency or constant pressure are absorbed in the liquid-mode fluid, resulting in such signals being suppressed.

The above described transducers together with the optical fibers and FBGs constitute sensors which are sensitive to acoustically induced dynamic pressure variations, but insensitive to constant and slowly varying pressures. Thus, the transducer embodiments above may be insensitive to pressure waves below a particular frequency, such as, for example, 10 kHz, 1 kHz, 100 Hz, or 10 Hz, or below. This makes the sensor insensitive to pressures consistent with the nominal downhole environment without decreasing the sensitivity to acoustic signals.

Figure 7A:
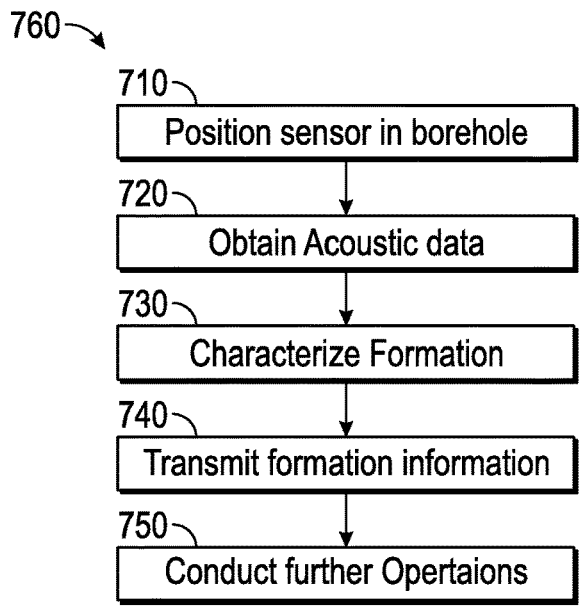
FIG. 7A shows a flow chart illustrating methods for performing well logging in a borehole intersecting an earth formation in accordance with embodiments of the present disclosure.

FIG. 7A shows a flow chart 700 illustrating methods for performing well logging in a borehole intersecting an earth formation in accordance with embodiments of the present disclosure. In optional step 710, an acoustic sensor in accordance with the present disclosure is positioned in the borehole. For example, an acoustic well logging tool may be conveyed in a borehole using a carrier. The borehole may be filled with downhole fluid, such as, for example, drilling fluid. In other examples, a sensor probe may be installed in the formation. See, for example, U.S. Pat. No. 7,201,221 to Tubel et al, which is commonly owned and herein incorporated by reference in its entirety.

Optional step 720 of the method 700 may include obtaining acoustic data with the acoustic sensor. Step 720 may include generating a plurality of acoustic signals within the borehole, or from seismic devices at the surface, and generating acoustic wave data at at least one sensor downhole in response to acoustic signals received at the sensor, such as, for example, a plurality of acoustic reflections of acoustic waves from a boundary responsive to the transmitted acoustic signals.

Step 730 comprises characterizing the formation using the acoustic data including generating formation information. Step 730 may include using the location in the formation for each reflection point to estimate at least one property of the acoustic reflective boundary. This may include estimating from the acoustic data a distance from a boundary, a dip, a location of the boundary in the formation, and so on. Optional step 740 comprises transmitting formation information uphole. Optional step 750 comprises conducting further operations in the formation in dependence upon the formation information.

Figure 7B:
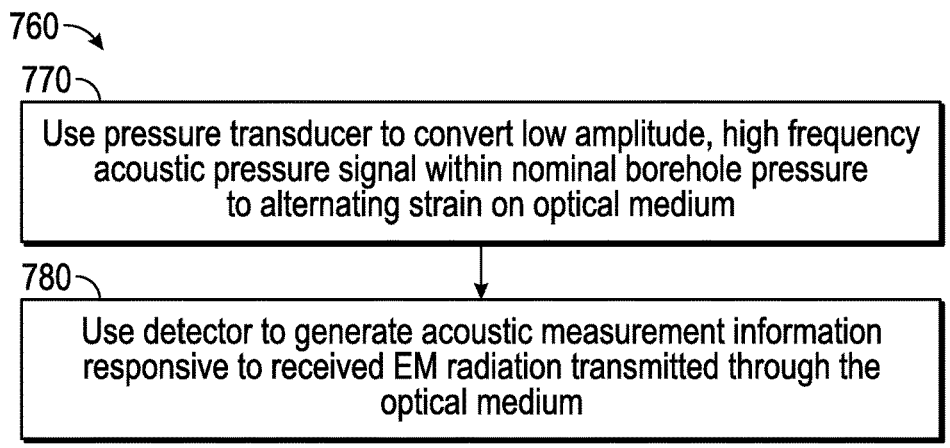
FIG. 7B shows a flow chart illustrating methods for obtaining acoustic data.

FIG. 7B shows a flow chart 760 illustrating methods for obtaining acoustic data. Step 770 comprises using a pressure transducer comprising a flexing member attached to an optical medium to convert a low amplitude, high-frequency acoustic pressure signal within a nominal borehole pressure incident on the pressure transducer to an alternating strain on the optical medium along an axis of the medium via movement of the flexing member. This may be carried out by mitigating a pressure offset due to the nominal borehole pressure.

Step 780 comprises using a detector to generate acoustic measurement information responsive to received electromagnetic radiation transmitted through the medium along the axis. The at least one optical property of the medium being responsive to the alternating strain on the medium such that the electromagnetic radiation received by the detector represents the acoustic signal.

Optional methods may include estimating a parameter of interest of the formation and using the parameter of interest to estimate a characteristic of a formation or to conduct further operations. Estimation of the parameter may include the use of a model. In some embodiments, the model may include, but is not limited to, one or more of: (i) a mathematical equation, (ii) an algorithm, (iii) an deconvolution technique, and so on. Reference information accessible to the processor may also be used.

Method embodiments may include conducting further operations in the earth formation in dependence upon formation information, estimated properties of the reflector(s), or upon models created using ones of these. Further operations may include at least one of: i) geosteering; ii) drilling additional boreholes in the formation; iii) performing additional measurements on the formation; iv) estimating additional parameters of the formation; v) installing equipment in the borehole; vi) evaluating the formation; vii) optimizing present or future development in the formation or in a similar formation; viii) optimizing present or future exploration in the formation or in a similar formation; ix) drilling the borehole; and x) producing one or more hydrocarbons from the formation information.

Estimated parameters of interest may be stored (recorded) as information or visually depicted on a display. The parameters of interest may be transmitted before or after storage or display. For example, information may be transmitted to other downhole components or to the surface for storage, display, or further processing. Aspects of the present disclosure relate to modeling a volume of an earth formation using the estimated parameter of interest, such as, for example, by associating estimated parameter values with portions of the volume of interest to which they correspond, or by representing the boundary and the formation in a global coordinate system. The model of the earth formation generated and maintained in aspects of the disclosure may be implemented as a representation of the earth formation stored as information. The information (e.g., data) may also be transmitted, stored on a non-transitory machine-readable medium, and/or rendered (e.g., visually depicted) on a display.

The processing of the measurements by a processor may occur at the tool, the surface, or at a remote location. The data acquisition may be controlled at least in part by the electronics. Implicit in the control and processing of the data is the use of a computer program on a suitable non-transitory machine readable medium that enables the processors to perform the control and processing. The non-transitory machine readable medium may include ROMs, EPROMs, EEPROMs, flash memories and optical disks. The term processor is intended to include devices such as a field programmable gate array (FPGA).

The term "conveyance device" as used above means any device, device component, combination of devices, media and/or member that may be used to convey, house, support or otherwise facilitate the use of another device, device component, combination of devices, media and/or member. Exemplary non-limiting conveyance devices include drill strings of the coiled tube type, of the jointed pipe type and any combination or portion thereof. Other conveyance device examples include casing pipes, wirelines, wire line sondes, slickline sondes, drop shots, downhole subs, BHA's, drill string inserts, modules, internal housings and substrate portions thereof, self-propelled tractors. As used above, the term "sub" refers to any structure that is configured to partially enclose, completely enclose, house, or support a device. The term "information" as used above includes any form of information (Analog, digital, EM, printed, etc.). The term "processor" or "information processing device" herein includes, but is not limited to, any device that transmits, receives, manipulates, converts, calculates, modulates, transposes, carries, stores or otherwise utilizes information. An information processing device may include a microprocessor, resident memory, and peripherals for executing programmed instructions. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on. Thus, a processor may be configured to perform one or more methods as described herein, and configuration of the processor may include operative connection with resident memory and peripherals for executing programmed instructions.

As used herein, the term "fluid" and "fluids" refers to one or more gasses, one or more liquids, and mixtures thereof. A "downhole fluid" as used herein includes any gas, liquid, flowable solid and other materials having a fluid property and relating to hydrocarbon recovery. A downhole fluid may be natural or man-made and may be transported downhole or may be recovered from a downhole location. Non-limiting examples of downhole fluids include drilling fluids, return fluids, formation fluids, production fluids containing one or more hydrocarbons, engineered fluids, oils and solvents used in conjunction with downhole tools, water, brine, and combinations thereof. An "engineered fluid" may be used herein to mean a human made fluid formulated for a particular purpose. The term "geosteering" may refer to changing direction of the drill bit, stopping progression of the drill bit, or continuing advancement of the drill bit.

It is apparent that the values of slowness and velocity may be used interchangeably in the techniques disclosed herein. The parameters slowness and velocity are inversely related and the measurement of either may be converted to the other by simple mathematical relations that are well known in the art. Thus, the term "slowness" as used herein may refer to slowness as traditionally understood, as well as other parametric equivalents.

The term vertical seismic profile ('VSP') as used herein is meant to mean any of zero-offset VSP, offset VSP, walkaway VSP, walk-above VSP, salt-proximity VSP, shear-wave VSP, and drill-noise or seismic-while-drilling VSP. Acoustic signal is meant to mean any signal acoustically measured or processed, including seismic signals. The terms "fast varying" or "high-frequency" as used herein refer to frequency characteristics corresponding to typical acoustic signals used for measurement applications downhole. The terms "slowly varying" or "low-frequency" as used herein refer to frequency characteristics corresponding to acoustic signals below a level representing desired acoustic measurements, and may be represented by pressure waves below a cutoff frequency such as 10 kHz, 1 kHz, 100 Hz, 10 Hz, or below. Ambient pressure noise should be understood to refer to non-signal pressure variations endemic to borehole applications, including low frequency pressures, such as tool vibration. Mechanically filtering ambient pressure noise thus may suppress ambient noise tool vibration, such as pump noise. Tool vibration may have a characteristic frequency of 80 to 500 Hz, in comparison with an acoustic signal of 1 kHz or more.

While the foregoing disclosure is directed to the one mode embodiments of the disclosure, various modifications will be apparent to those skilled in the art. It is intended that all variations be embraced by the foregoing disclosure.

What is claimed is:

1. An apparatus for use in a borehole, comprising:
   an acoustic sensor including:
   a pressure transducer comprising a flexing member attached to an optical medium, the transducer configured to convert a low-amplitude, high-frequency acoustic pressure signal within a nominal borehole pressure incident on the transducer to an alternating strain on the optical medium along an axis of the medium via movement of the flexing member while suppressing conversion of low-frequency signals and constant pressure into strain of the optical medium, the acoustic pressure signal propagated via a downhole fluid coupled with the transducer, wherein the pressure transducer comprises an interface between reservoirs containing a reservoir fluid, the interface comprising the flexing member and at least one opening providing for communication of the reservoir fluid between the reservoirs; and a detector configured to generate acoustic measurement information responsive to received electromagnetic radiation transmitted through the medium along the axis, at least one optical property of the medium being responsive to the alternating strain on the medium such that the electromagnetic radiation received by the detector represents the acoustic signal.

2. The apparatus of claim 1 wherein the pressure transducer is configured to fluid-mechanically filter low-frequency ambient pressure noise.

3. The apparatus of claim 1 wherein the opening and the reservoirs are configured to fluid-mechanically filter ambient pressure noise using bypass flow of the reservoir fluid through the opening via pressure equalization.

4. The apparatus of claim 1 wherein the flexing member comprises at least one of: i) a membrane; and ii) a bender bar.

5. The apparatus of claim 4 wherein the at least one opening comprises at least one of: i) a slit in the flexing member; and ii) a capillary tube.

6. The apparatus of claim 5 wherein the at least one opening comprises a plurality of slits, and the flexing member comprises a portion of the interface between a first slit of the plurality and a second slit of the plurality.

7. The apparatus of claim 1 wherein the pressure transducer comprises a second interface between one of the reservoirs and the downhole fluid, the second interface comprising a second flexing member responsive to the high-frequency acoustic pressure signal incident on the transducer.

8. The apparatus of claim 1 wherein a first reservoir of the reservoirs is defined by a first reservoir member and a second reservoir of the reservoirs is defined by a second reservoir member, and the first reservoir member is received by the second reservoir member.

9. The apparatus of claim 8 wherein the dimensions and orientations of the reservoirs are configured to suppress acceleration-induced quasi-hydrostatic pressure signals by producing a pressure at the flexing member in the first reservoir substantially equal to another pressure at the flexing member in the second reservoir.

10. The apparatus of claim 9 in which every plane normal to a line intersecting the center of gravity of the combined reservoir fluid volumes intersects either: i) both the first reservoir and the second reservoir, or ii) neither the first reservoir nor the second reservoir.

11. The apparatus of claim 1 wherein the transducer comprises a flexural element supporting the flexing member.

12. The apparatus of claim 1 wherein the transducer comprises a flexural element supporting the flexing member and configured to amplify movement of the flexing member.

13. The apparatus of claim 12 wherein the medium comprises fiber Bragg gratings positioned with respect to the flexural element proximate a location of maximum displacement of the medium.

14. The apparatus of claim 1 wherein the transducer comprises a reservoir filled with a dilatant fluid, the dilatant fluid configured to act, responsive to the high-frequency acoustic pressure signal, as a solid transmitting the high-frequency acoustic pressure signal to the flexing member, and the dilatant fluid configured to act, responsive to the ambient pressure noise, as a liquid preventing transmission of the ambient pressure noise to the flexing member.

15. The apparatus of claim 1 wherein a ratio of an average signal amplitude of the high-frequency acoustic pressure signal to the nominal borehole pressure is less than $10^{-3}$.

16. The apparatus of claim 1 wherein the apparatus comprises a portion of a drillstring and wherein the pressure transducer is configured to fluid-mechanically filter low-frequency ambient pressure noise comprising vibration of the drillstring.

17. The apparatus of claim 1 wherein the received radiation comprises at least one of: i) radiation transmitted through a fiber Bragg grating (FBG) in the medium; ii) radiation reflected from a fiber Bragg grating (FBG) in the medium.

18. A method for acoustic detection in a borehole, comprising:

using a pressure transducer comprising a flexing member attached to an optical medium to convert a low amplitude, high-frequency acoustic pressure signal within a nominal borehole pressure incident on the pressure transducer to an alternating strain on the optical medium along an axis of the medium via movement of the flexing member while suppressing conversion of low-frequency signals and constant pressure into strain of the optical medium, the acoustic pressure signal propagated via a downhole fluid coupled with the transducer, wherein the pressure transducer comprises an interface between reservoirs containing a reservoir fluid, the interface comprising the flexing member and at least one opening providing for communication of the reservoir fluid between the reservoirs; and using a detector to generate acoustic measurement information responsive to received electromagnetic radiation transmitted through the medium along the axis, at least one optical property of the medium being responsive to the alternating strain on the medium such that the electromagnetic radiation received by the detector represents the acoustic signal.

19. The method of claim 18 further comprising using the acoustic measurement information to estimate a parameter of interest comprising at least one of: i) a slowness of a volume of interest of the formation; ii) an acoustic data communication message; iii) a stand-off from the transducer to a wall of the borehole; iv) a geometry of the borehole; and v) a sound speed of the downhole fluid.

* * * * *